(12) United States Patent
Medina-Sanchez

(10) Patent No.: US 9,389,112 B2
(45) Date of Patent: Jul. 12, 2016

(54) METHOD AND DEVICE FOR DETECTING THE TANK FILLING LEVEL IN A MOTOR VEHICLE

(71) Applicant: Deutz AG, Cologne (DE)

(72) Inventor: Gonzalo Medina-Sanchez, Cologne (DE)

(73) Assignee: Deutz AG, Cologne (DE)

( * ) Notice: Subject to any disclaimer, the term of this patent is extended or adjusted under 35 U.S.C. 154(b) by 521 days.

(21) Appl. No.: 13/713,555

(22) Filed: Dec. 13, 2012

(65) Prior Publication Data

US 2013/0160541 A1    Jun. 27, 2013

(30) Foreign Application Priority Data

Dec. 22, 2011  (DE) .......................... 10 2011 122 127

(51) Int. Cl.
  *G01F 23/00*  (2006.01)
  *G01F 23/22*  (2006.01)
  *G01F 23/30*  (2006.01)
  *G01F 23/296*  (2006.01)

(52) U.S. Cl.
  CPC ............ *G01F 23/22* (2013.01); *G01F 23/2962* (2013.01); *G01F 23/30* (2013.01)

(58) Field of Classification Search
  CPC ..................................................... G01F 23/00
  USPC .................. 73/305, 290 R, 290 V; 702/55
  See application file for complete search history.

(56) References Cited

U.S. PATENT DOCUMENTS

| | | | | |
|---|---|---|---|---|
| 6,157,894 A | * | 12/2000 | Hess | B64D 37/00 702/141 |
| 6,502,042 B1 | * | 12/2002 | Eid | G01F 23/0069 702/50 |
| 7,603,242 B2 | | 10/2009 | Tichborne et al. | |
| 2004/0073386 A1 | * | 4/2004 | Benedetti | G01F 23/0076 702/55 |
| 2004/0079150 A1 | * | 4/2004 | Breed | B60J 10/00 73/291 |
| 2005/0072226 A1 | * | 4/2005 | Pappas | G01F 23/2962 73/290 V |
| 2006/0025897 A1 | * | 2/2006 | Shostak | B60C 23/005 701/1 |
| 2008/0236275 A1 | * | 10/2008 | Breed | B60C 11/24 73/290 V |
| 2013/0111987 A1 | * | 5/2013 | Ciani | B22D 11/205 73/290 R |

FOREIGN PATENT DOCUMENTS

DE  19929295  12/2000

* cited by examiner

*Primary Examiner* — Hezron E Williams
*Assistant Examiner* — Hoang Nguyen
(74) *Attorney, Agent, or Firm* — Davidson, Davidson & Kappel, LLC

(57) ABSTRACT

A method for detecting the filling level in a motor vehicle. A device for ascertaining the tank filling level value of moving vehicles, including at least one tank, at least one filling level sensor, at least one control unit and at least one pump.

8 Claims, 3 Drawing Sheets

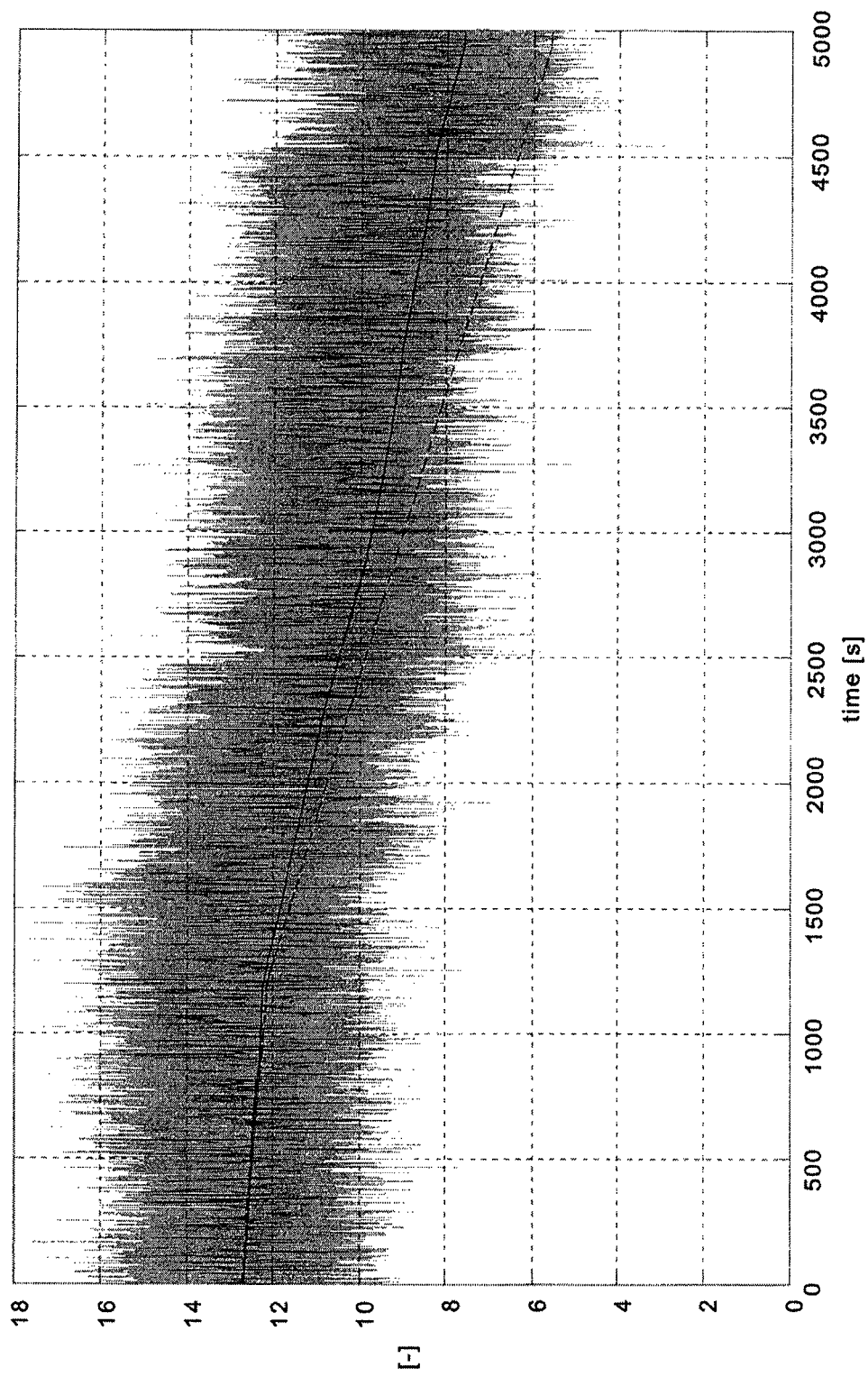

METHOD AND DEVICE FOR DETECTING THE TANK FILLING LEVEL IN A MOTOR VEHICLE

This claims the benefit of German Patent Application DE 10 2011 122 127.5, filed Dec. 22, 2011 and hereby incorporated by reference herein.

The present invention relates to a method and a device for detecting the tank filling level in a motor vehicle.

BACKGROUND

Such approaches work by detecting an analog signal of a tank filling level sensor. The signal is sharply filtered through algorithms implemented in a control unit in order to reduce the sloshing in the signal caused by driving. Since the characteristic constant of the low-pass filter must be large, the low-pass filter becomes slower. The filtered signal will not indicate the prevailing filling level but instead will indicate a previous filling level. This is noticeable in particular when the liquid is being pumped out of the tank, as in the case of a fuel tank or an ADBLUE (a trademark as described below, also known as a diesel exhaust fluid or AUS 32) tank.

In addition, there are complex methods which attempt to increase the reliability of the low-pass filter result by taking into account the vehicle state (acceleration, braking, maintaining speed, stopping, etc.). Other methods use a second low-pass filter, which is faster than the first. This second low-pass filter should supply more up-to-date information about the filling level but its area of use is limited to vehicle states in which the sloshing turns out to be lower.

Other methods subtract the accumulated spent setpoint quantity of fuel in the case of a vehicle tank or the accumulated metered setpoint ADBLUE quantity in the case of an ADBLUE tank from an initial filling level during the sloshing phase to ascertain the filling level. The initial filling level should be measured by the filling level sensor in a "resting" phase. Each time the vehicle is in a "resting" phase, the initial filling level is measured again and the accumulated setpoint quantity is set to zero. This method relates to the desired quantity or the quantity to be injected or the quantity to be metered since the actual quantity injected is unknown due to tolerances, drift, aging, etc. This results in a deviation in the actual tank filling level, which increases over time and may be reset in the next "resting" phase.

SUMMARY OF THE INVENTION

Resetting has as a reference the tank filling level sensor value, which may be a possible source of error with certain tank filling level sensors, e.g., with so-called switching stage sensors. This method would be at fault if, for example, the tank filling level measured by the filling level sensor corresponds to a certain switching stage but the actual filling level is closer to the next stage.

The known methods have the disadvantage that additional characteristic variables and safety measures are required, resulting in substantially greater effort in calibration and in tests.

It is an object of the present invention to provide a device and a method for detecting the tank filling level in a motor vehicle, which avoid the disadvantages mentioned above while being simpler, more accurate and more reliable.

The method described here and the corresponding device ascertain the tank filling level continuously (independently of the type of tank filling level sensor, the switching stage, ultrasound, etc.) as a function of the mathematical relationship between the tank volume and the tank filling level, from the setpoint quantity injected or metered and pumped out of the tank, from the stochastic properties of sloshing and from the stochastic scattering of the fuel injector or the metering module.

With this information, the tank filling level system may be modeled mathematically with the aid of a state space system, and the tank volume value as well as the tank filling level may be ascertained continuously and the tank filling level sensor value may be filtered by using a Kalman filter.

According to the present invention, it is advantageous here that a more detailed method of ascertaining the tank filling level and the tank volume is possible.

A few advantages are described in keywords as follows:
simple algorithm
independent of the type of tank filling level sensor
vehicle state need not be taken into account
no additional safety margin
little effort in calibration and official verification.

BRIEF DESCRIPTION OF THE DRAWINGS

The present invention will now be presented on the basis of an exemplary embodiment with reference to the drawings, in which:

FIG. 3 shows a measurement diagram of the filling level over time.

DETAILED DESCRIPTION

Figure 1:
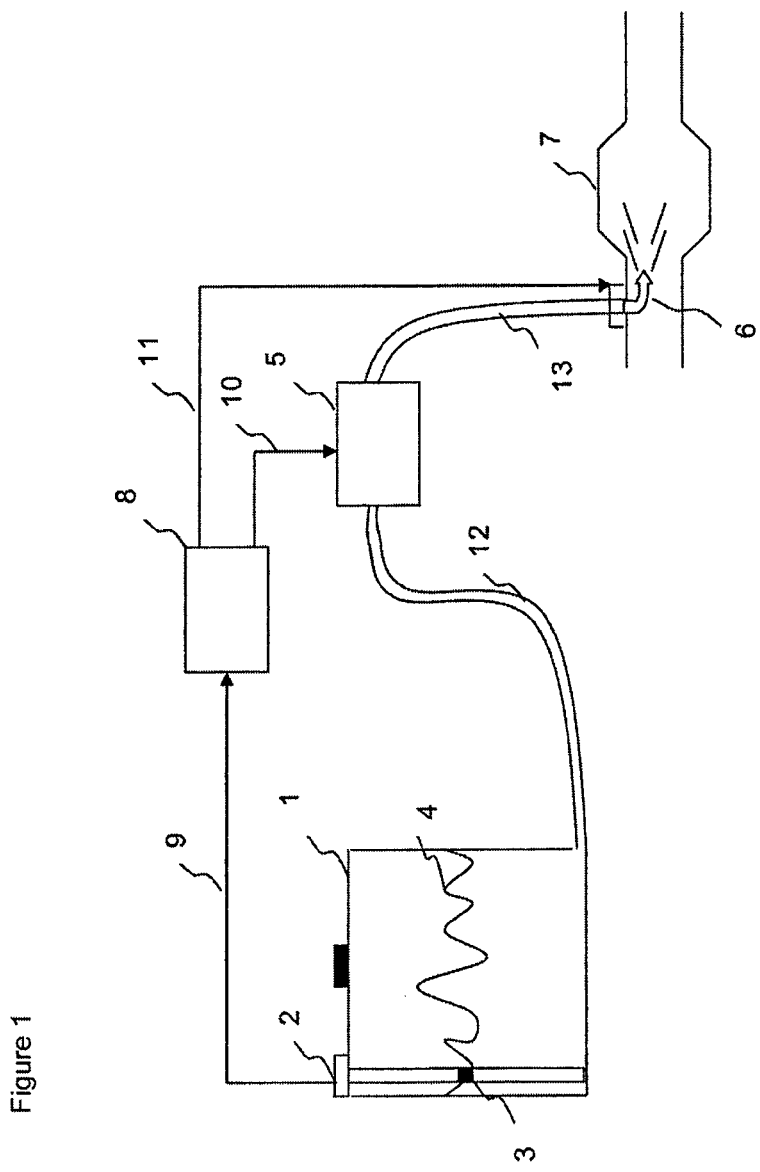
FIG. 1 shows an SCR system having a tank filling level measuring device

The use of a Kalman filter to ascertain the tank filling level value is illustrated below for use in a system such as that shown in FIG. 1.

The Kalman filter algorithm relates to the estimation of a time-discrete process, which may be represented by the following differential equation:

$$X_k = F_{k-1} X_{k-1} + B_{k-1} u_{k-1} + w_{k-1} \tag{1}$$

$$Z_k = H_k X_k + v_k \tag{2}$$

$X_k$: the system state variable to be estimated.
$F_{k-1}$: describes the transitions between states $X_{k-1}$ and $X_k$ which follow one another chronologically.
$B_{k-1}$: describes the relationship between $X_k$ and $u_{k-1}$.
$u_{k-1}$: is the active disturbance.
$w_{k-1}$: is the noise term and represents the random components that cannot be detected. The noise $w_{k-1}$ not correlated over time has a mean value of 0 and a covariance Q.
$Z_k$: is the measured variable.
$H_k$: describes the relationship between measured variable $Z_k$ and state variable $X_k$.
$v_k$: represents the measurement noise; "$v_k$" has a mean value of 0 and a covariance R.

The Kalman filter algorithm estimates state variable $X_k$ on the basis of a recursive method using a predictive component:

$$\hat{x}_{k|k-1} = F_{k-1} \hat{x}_{k-1} + B_{k-1} u_{k-1} \tag{3}$$

$$\hat{P}_{k|k-1} = F_{k-1} \hat{P}_{k-1} F_{k-1}^T + Q_{k-1} \tag{4}$$

and a corrective component:

$$\hat{x}_k = \hat{x}_{k|k-1} + \hat{K}_k \tilde{y}_k \tag{5}$$

$$\hat{P}_k = \hat{P}_{k|k-1} - \hat{K}_k S_k \hat{K}_k^T \tag{6}$$

$$\tilde{y}_k = z_k - H_k \hat{x}_{k|k-1} \tag{7}$$

$$S_k = H_k \hat{P}_{k|k-1} H_k^T + R_k \quad (8)$$

$$\hat{K}_k = \hat{P}_{k|k-1} H_k^T S_k^{-1} \quad (9)$$

The present invention relates to the application of the Kalman filter for estimating a tank filling level. First, the different state variables must be identified.

In an ideal tank having an ideal filling level sensor, i.e., tolerances are equal to 0, and there is no sloshing, the filling level may be described mathematically:

$$L = h * \text{Vol} \quad (10)$$

L: measured level
Vol: volume
h: is the mathematical relationship between level and volume; "h" is defined by the geometry of the tank, e.g., for a cube-shaped container, h=1/A: A=area perpendicular to the sensor.

Another mathematical equation which holds for this system is:

$$\text{Vol} = \text{Vol}_0 - d * m \quad (11)$$

where
Vol: volume
$\text{Vol}_0$: volume of the tank at time=0
d: liquid density
m: mass to be injected In a nonideal situation—the vehicle is moving on an undulating road, for example—the tolerances of the filling level sensor and the injection module as well as sloshing must be taken into account.

Sloshing and the filling level sensor tolerance are added in equation (10):

$$L = h * \text{Vol} + s \quad (12)$$

where "s" denotes the random and not detectable components of filling level sensor tolerance and sloshing; "s" is a stochastic variable having a mean value of 0 and a known covariance Q.

The tolerance of the injection module (w) must be added in (11).

$$\text{Vol} = \text{Vol}_0 - d * m + w \quad (13)$$

where "w" is a stochastic variable having mean value of 0 and a known covariance R.

Equations (12) and (13) may be rewritten as (1) and (2):

$$(13) \rightarrow \quad (1)$$

$$\text{Vol}_k = (1)\text{Vol}_{k-1} + (-d) * m_{k-1} + w_{k-1} \quad (14)$$

$$(12) \rightarrow \quad (2)$$

$$L_k = h \text{Vol}_k + s_k \quad (15)$$

for one computation cycle k
$X_k = \text{Vol}_k$
$F_{k-1} = 1$
$B_{k-1} = d$
$u_{k-1} = m_{k-1}$
$w_{k-1} = w$
$Z_k = L_k$
$H_k = h$
$v_{k-1} = s$ The prevailing volume of a container may be ascertained with the aid of a Kalman filter using these identified elements of the state space despite the interferences such as component tolerances and sloshing for each computation cycle k.

The diagram in FIG. 1 shows part of the exhaust gas treatment system, which uses selective catalytic reduction (SCR). The tank (1) contains AdBlue.

ADBLUE (ISO 22241/DIN 70070/AUS32) is the brand name of a clear synthetic 32.5% solution of high purity urea in demineralized water, which is used for after treatment of exhaust gas in an SCR catalytic converter. By selective catalytic reduction (SCR), the emission of nitrogen oxides (NOx) is reduced by about 90% (in steady-state operation). The German Association of the Automobile Industry (VDA) holds the trademark rights for ADBLUE. Filling level sensor (2) detects the filling level via a floating gauge (3). Sloshing (4) caused by the movement of the vehicle interferes with correct detection of the filling level. The filling level sensor value is transmitted to control unit (8) over electrical line (9). The control unit controls pump (5) via electrical line (10) and controls metering module (6) via electrical line (11). Pump (5) pumps ADBLUE through tubes (12) and (13) in the direction of metering module (6), and metering module (6) injects ADBLUE into the SCR catalytic converter (7).

The control unit calculates the quantity of ADBLUE to be metered as a function of external influencing factors. The control unit must monitor the tank filling level and issue warnings, if necessary, and in the extreme case must reduce engine power, among other possible responses.

Figure 2:
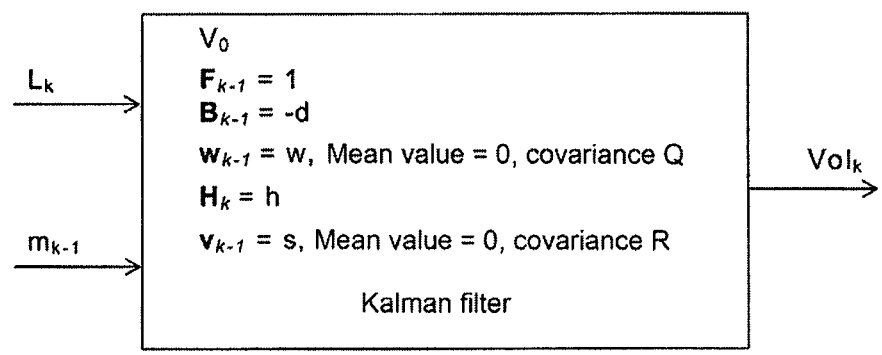
FIG. 2 shows a schematic diagram of the Kalman filter

The Kalman filter is illustrated in FIG. 2 and is used as described below:
for each computation cycle k:
$L_k$ is the noise level measured by filling level sensor (2).
$m_{k-1}$ is the setpoint quantity to be injected by metering module (6).
$\text{Vol}_k$ is the volume ascertained and filtered by the Kalman filter.

The graph in FIG. 3 shows:
The blue line, resembling an envelope curve, shows the volume detected by filling level sensor (2).
The yellow line (bottom) indicates the volume ascertained with the aid of formula (11).
The red line (top) indicates the volume ascertained with the aid of the Kalman filter according to the present invention.

The present invention is suitable for ascertaining the filling level of systems, which include a tank, a pump and a fuel injector. The present invention is suitable in particular for systems in moving vehicles.

REFERENCE LIST 1 tank
2 filling level sensor
3 floating gauge
4 sloshing (wave-like change in the liquid level)
5 pump
6 metering module
7 SCR catalytic converter
8 control unit
9 electrical line
10 electrical line
11 electrical line
12 tube/pipeline
13 tube/pipeline

What is claimed is:
1. A device for ascertaining a tank filling level value of a moving vehicle, comprising:
at least one tank filled with a liquid;
at least one filling level sensor configured for obtaining a tank filling level sensor value;
at least one control unit configured for ascertaining a tank volume value with the aid of a Kalman filter and obtaining a filtered tank filling level value based on the tank volume value; and at least one pump, wherein the at least one control unit is configured for ascertaining the tank volume value with the aid of the Kalman filter according to the following formula:

$$\text{Vol}_k = (1)\text{Vol}_{k-1} + (-d)*m_{k-1} + w_{k-1}$$

where Vol is the tank volume value,
where d is a liquid density in the tank,
where m is the mass injected from the tank,
where w is a stochastic variable, and
where k is a computation cycle.

2. The device as recited in claim 1 wherein the filling level sensor is an ultrasonic sensor.

3. The device as recited in claim 1 wherein the filling level sensor includes at least one floating gauge.

4. The device as recited in claim 1 wherein the liquid is a solution of urea.

5. The device as recited in claim 4 wherein the solution of urea is ADBLUE.

6. The device as recited in claim 1 further comprising a metering module configured for metering the liquid from the tank.

7. The device as recited in claim 6 further comprising a selective catalytic reduction catalytic converter arranged for receiving the liquid from the metering module.

8. A method for ascertaining a tank filling level of a liquid in a tank, comprising the following steps:
   ascertaining a state space system;
   then ascertaining a tank volume value with the aid of a Kalman filter;
   ascertaining a tank filling level sensor value; and
   subsequent filtering of the tank filling level sensor value based on the ascertained tank volume value to obtain a filtered tank filling level sensor value,
wherein the ascertaining the tank volume value with the aid of the Kalman filter is according to the following formula:

$$\text{Vol}_k = (1)\text{Vol}_{k-1} + (-d)*m_{k-1} + w_{k-1}$$

where Vol is the tank volume value,
where d is a liquid density in the tank,
where m is the mass injected from the tank,
where w is a stochastic variable, and
where k is a computation cycle.

\* \* \* \* \*